(12) United States Patent
Takizawa et al.

(10) Patent No.: US 7,775,614 B2
(45) Date of Patent: Aug. 17, 2010

(54) INK JET RECORDING APPARATUS AND METHOD OF CONTROLLING THE SAME FOR COMPLEMENTARY RECORDING

(75) Inventors: Mitsuharu Takizawa, Kunitachi (JP); Tatsuya Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 11/103,086

(22) Filed: Apr. 11, 2005

(65) Prior Publication Data
US 2005/0225585 A1 Oct. 13, 2005

(30) Foreign Application Priority Data
Apr. 13, 2004 (JP) .............................. 2004-118048
Mar. 15, 2005 (JP) .............................. 2005-073113

(51) Int. Cl.
*B41J 29/38* (2006.01)
(52) U.S. Cl. .............................. 347/9; 347/14; 347/16; 347/41
(58) Field of Classification Search .................... 347/16, 347/9, 14, 41
See application file for complete search history.

(56) References Cited

U.S. PATENT DOCUMENTS 6,257,143 B1 * 7/2001 Iwasaki et al. .............. 101/481
6,270,187 B1 * 8/2001 Murcia et al. .................. 347/43
6,443,556 B1   9/2002 Garcia et al.
6,547,360 B2   4/2003 Takahashi et al.
6,659,580 B2 * 12/2003 Horikoshi ....................... 347/9
6,771,379 B2 * 8/2004 Vilanova et al. ........... 358/1.14
6,863,361 B2 * 3/2005 Barr et al. ..................... 347/19
2002/0008723 A1   1/2002 Wen et al.
2004/0183843 A1 * 9/2004 Walmsley et al. ............. 347/12

FOREIGN PATENT DOCUMENTS

| JP | 5-155040 A | 6/1993 |
| JP | 2000-037866 A | 2/2000 |
| JP | 2000-127370 A | 5/2000 |
| JP | 2002-144549 A | 5/2002 |
| JP | 2003-175592 A | 6/2003 |

* cited by examiner

*Primary Examiner*—Matthew Luu
*Assistant Examiner*—Henok Legesse
(74) *Attorney, Agent, or Firm*—Canon U.S.A., Inc. I.P. Division

(57) ABSTRACT

The present invention provides complementary recording in that when a defective nozzle is generated, recording is performed by other normal nozzles. According to the present invention, a mask pattern used for multipath recording, which completes an image by multiple scannings with a recording head, is rewritten when a defective nozzle is generated. Rewriting mask data is produced in a CPU register, and the mask pattern is rewritten by repeating the produced mask data. According to the present invention, it is not necessary to prepare mask data by assuming a defective nozzle in advance, so that high speed complementary recording processing can be performed with simple configuration.

1 Claim, 7 Drawing Sheets

◎ NON-MASK NOZZLE   □ MASK NOZZLE

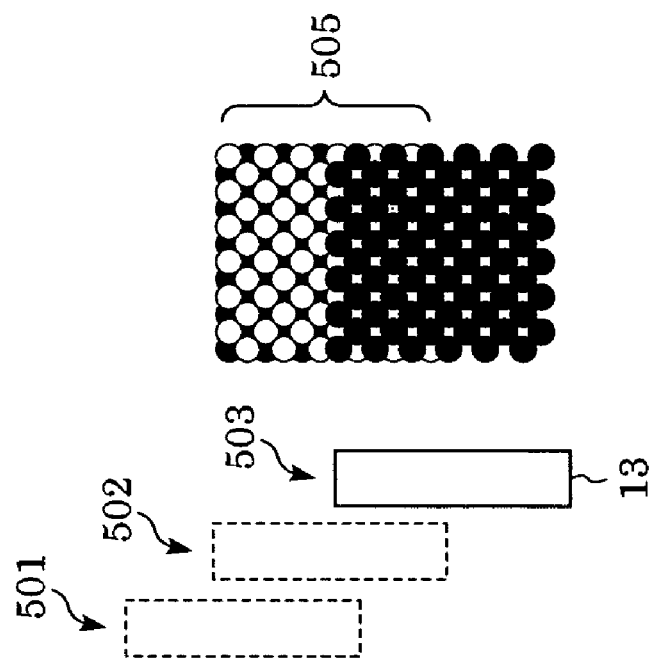
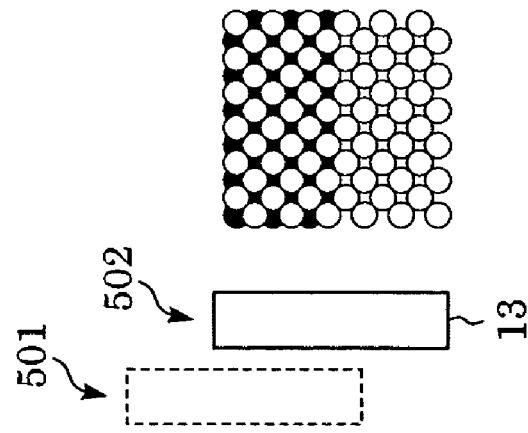
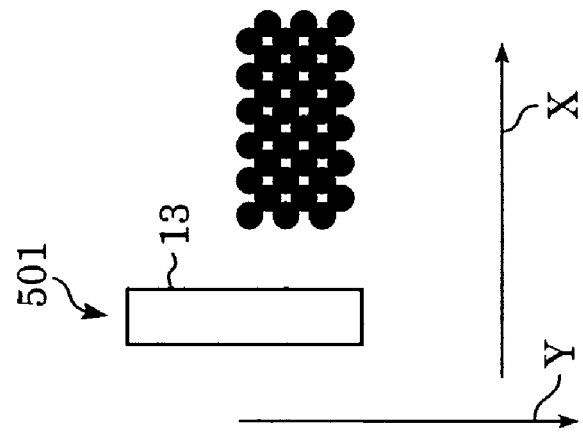

INK JET RECORDING APPARATUS AND METHOD OF CONTROLLING THE SAME FOR COMPLEMENTARY RECORDING

BACKGROUND OF THE INVENTION

1. Field of the Invention

The present invention relates to image-forming apparatuses for forming characters and images on a recording medium, and in particular, relates to an inkjet image-forming apparatus ejecting ink for recording. The inkjet image-forming apparatus generally uses a recording head having a plurality of ink ejection nozzles to eject ink from an orifice at the end of each nozzle for recording. The present invention also relates to a technique for complementarily recording a region where recording is difficult due to a non-ejection nozzle among the plurality of ink ejection nozzles using a normal nozzle.

2. Description of the Related Art

Recently, inkjet recording apparatuses have been rapidly developed and widely used for recording apparatuses of PCs, copying machines, and word processors. In particular, the recording apparatus has been colorized along with the advancement in capabilities of office automation equipment, so that various color inkjet recording apparatuses have been developed. Also, inkjet recording apparatuses for fine digital pictures taken by digital cameras have become widely used.

An inkjet recording apparatus generally includes a carriage having a recording head and an ink tank, a conveying unit for conveying a recording sheet, and a controlling unit for controlling these units to record images on a recording medium by ejecting ink droplets from a plurality of orifices of the recording head. In a generally known serial recording apparatus, a recording sheet is scanned with the recording head in a direction (referred to as a main scanning direction below) perpendicular to a conveying direction of the recording sheet (referred to as a counter-scanning direction below) for recording. In this serial recording apparatus, by repeating the scanning with the recording head in the main scanning direction and intermittent conveying of the recording sheet during non-recording in the counter-scanning direction, the recording on the entire recording medium is completed. The color inkjet recording apparatus has a recording head capable of ejecting multicolor ink. By overlapping ink droplets ejected to correspond to a plurality of colors from the recording head, color images are formed.

In the inkjet recording apparatus, a heater element and a piezoelectric element are widely known as ink ejecting means. In the method using the heater element, there is provided the heater element (electrothermal conversion member) arranged in the vicinity of an orifice, and by applying an electric signal to the heater element, ink is locally heated so as to generate bubbles so that ink is ejected by a pressure produced when the bubbles are generated. In the method using an electromechanical conversion member such as the piezoelectric element, a pressure is mechanically produced in ink using an electro-pressure converter such as the piezoelectric element to eject the ink.

Since in the inkjet recording apparatus, a recording medium is scanned with the recording head with the recording head out of contact with the recording medium, noise is reduced in comparison with known recording systems such as a thermal recording system and a thermal transfer recording system. As the inkjet system is recording by bonding ejected ink on a recording medium, this system has an advantage that images can be recorded on various recording media, such as coated paper and normal paper. Due to such advantages, the inkjet recording apparatus has become widely used. Another advantage of an inkjet system is that recording is easily achieved on a large-sized recording medium, and thus, can be used to record on such large items such as an advertisement poster or fabric cloth, such as clothing. As described above, the inkjet recording apparatus has been recognized by various industrial fields as excellent recording means. However, more highly improved-quality images are being required, as well as faster printing times.

As for a recording method of the color inkjet recording apparatus, a method using three-color inks of cyan (C), magenta (M), and yellow (Y) has been known. Also, four-color inks have been generally known, in which in addition to the three-color inks, black (Bk) ink is added.

A monochrome inkjet recording apparatus for recording by ejecting only the black ink is mainly used for recording characters and line drawing. On the other hand, in the color inkjet recording apparatus for recoding color images, various properties, such as color-forming properties, gradation, and uniformity, are demanded as performances of the apparatus.

The quality of recorded images largely depends on the performance of the recording head. The shape of the recording head orifice and the ejecting means for ejecting ink may exhibit variations during the manufacturing process of the recording head. The variations during the manufacturing process may have a bad influence upon the amount of ejected ink and the ejection direction, resulting in unevenness in density of finally recorded images due to the slight variation of each orifice.

The variations in ejection amount and direction for each orifice periodically generate a "white portion" where 100% area factor is not satisfied, and a high-density portion caused by excessively overlapped dots in recorded images so as to exhibit density unevenness. Also, excessive variations in the ejection direction may generate white streak in recorded images. These phenomena are normally perceived as the density unevenness by human eyes.

A multi-path recording system has been proposed for solving such a density unevenness problem. This multi-path recording system is described with reference to FIGS. 7A to 7C.

FIGS. 7A to 7C are drawings for illustrating the known multi-path recording system. For discussion purposes, in the drawings, a single-color recording head (an inkjet head 13) with eight nozzles (orifices) is described.

FIG. 7A illustrates a first scanning recording scanned with the recording head in the main scanning direction. In the drawing, arrow Y denotes the counter-scanning direction and arrow X denotes the main scanning direction.

In the first scanning with the recording head in the main scanning direction, a position of the recording head along the counter-scanning direction is shown by numeral 501. In the first scanning, using four nozzles at the forefront of the eight nozzles, a staggered pattern (pattern indicated by positions of symbol ●) is recorded. In the description herein, a recording medium is conveyed in the upper direction of the drawing so that the lowest nozzle of the recording head 13 is the forefront of the nozzle line.

Then, the recording medium is conveyed in the counter-scanning direction by half of the recording width of the recording head 13. Since in the example of FIGS. 7A to 7C, the recording width of the recording head 13 corresponds to eight dots, the recording medium is conveyed by the width of four dots.

Consequently, a second scanning is performed with the recording head 13. FIG. 7B is an explanatory view illustrating the second scanning. As shown in the drawing, in the second scanning, a staggered pattern reverse to that of the first scanning (pattern indicated by positions of symbol ○) is recorded using all eight nozzles of the recording head. By the recording in the second scanning, the recording a recording region corresponding to half of the recording width of the recording head 13 is completed. In the recording of the second scanning shown in FIG. 7B, the conveying operation after the first scanning is controlled so that the recording head 13 is displaced in the counter-scanning direction (arrow Y direction) relative to the position of the recording head 13 in the counter-scanning direction in the first scanning. Hence, in the second scanning, the recording head 13 is located at a position indicated by numeral 502 while in the first scanning, the recording head 13 is located at the position 501 relative to the recording medium, so that the recording medium is scanned in arrow X direction of FIG. 7A (main scanning direction) so as to record images.

Similarly, after the second scanning, the medium is conveyed in the counter-scanning direction by a distance corresponding to half of the recording width of the recording head 13. Consequently, a third scanning is performed with the recording head 13 for recording. The third scanning is described with reference to FIG. 7C. During the third scanning, the position of the recording head 13 is indicated by numeral 503, and is displaced in the counter-scanning direction by a distance corresponding to the recording width of the recording head 13 relative to the first scanning, while being displaced in the counter-scanning direction by a distance corresponding to half of the recording width of the recording head 13 relative to the second scanning. Also, in the third scanning, in the same way as the preceding scanning recordings, the medium is scanned with the recording head 13 in the main scanning direction so as to record images. In the third scanning, in the same way as in the first scanning, dots are recorded in the same staggered pattern (pattern indicated by positions of symbol ●). The execution of the first to the third scanning brings to completion of the recording images of the region width corresponding to numeral 505 in the drawing.

As described above, in the example of the multi-path recording system shown in FIGS. 7A to 7C, while the medium being conveyed in a four-dot unit, the staggered pattern and the reverse staggered pattern are alternately recorded in each scanning. By this recording operation, the four-dot width unit recording region is completed for each scanning. In such a manner, one line (recording region where is once scanned with the recording width of the recording head) is recorded with two different nozzles, so that high-quality images with suppressed density unevenness can be formed. Since in the multi-path recording system, the amount recorded with one time scanning can be reduced, the system has an effect suppressing bleeding (blur). Since the number of dots recorded with one time scanning can also be reduced, the system simultaneously has an effect suppressing the temperature rising of the recording head. The temperature rising of the recording head may cause ejection failure, so that the ejection failure may also be suppressed.

In the multi-path recording system mentioned above, several techniques have been known in producing data (path data) for recording (ejecting ink) corresponding to each scanning. For example, a technique for producing data by thinning out recording data using staggered/reverse staggered patterns mentioned above (fixed thinning system), a technique for producing path data by thinning out recording data using a random mask pattern having recording dots and non-recording dots arranged at random (random thinning system), and further a technique for producing path data by thinning out recording dots (data thinning system) are known. The technique for producing path data with the random mask is disclosed in Japanese Patent Laid-Open No. 05-155040.

In the recording head of the inkjet recording apparatus, if a non ink-ejecting state is left for a long time, ink is thickened in an ink flow path, especially in the vicinity of the orifice, so that the ink may not be normally ejected.

If the recording operation continues with high recording-dot ratio (high recording duty), micro bubbles are produced in ink within the ink flow path along with ink ejection. If the generated micro bubbles grow so as to remain in the ink flow path, the ejection is affected so that normal ejection may not be performed from the recording head. These bubbles may be mixed in ink in a connection part of an ink supply path in addition to those generated along with the ink ejection mentioned above. There may also be a case where ink cannot be ejected from a nozzle corresponding to a damaged or depleted ink-ejecting element and a case where ink cannot be ejected due to an unrecoverably clogged nozzle.

Such ink non-ejection reduces the reliability of the recording apparatus because a portion unable to be recorded is produced in images to be recorded. A recording technique has been known for complementing an image defect produced by such non-ejection with other normal nozzles.

For example, a recording technique for complementing the non-ejection is disclosed in Japanese Patent Laid-Open No. 2000-094662. In this publication, a method is disclosed in that using the above-mentioned multi-path recording system, a position corresponding to a non-ejection nozzle is recorded with another nozzle capable of recording with scanning according to data for the non-ejection nozzle. A method is also disclosed in that when a non-ejection nozzle is produced, a mask pattern for multi-path recording is changed or a new mask pattern is formed.

In the recording technique for complementing the non-ejection nozzle of the multi-path recording system, mask pattern data are rewritten corresponding to positions of non-ejection nozzles, so that forming new mask pattern data corresponding to the entire nozzles requires a long time.

For reducing the rewriting procedure of the mask pattern, the mask pattern may be changed so that the data of the non-ejection nozzle is allocated to only one specific nozzle. However, this method reduces the advantage reducing the unevenness obtained by the multi-path recording system. The nozzle for the complement may be used very often, resulting in deterioration of image quality.

Also, the mask pattern data may be changed so that data corresponding to non-ejection nozzles are allocated to a plurality of other nozzles for recording positions corresponding to the non-ejection nozzles. However, with increasing number of scannings until image completion in the multipath recording, more time is required for the changing procedure.

There is also a technique in that mask data are prepared for completing images with the number of paths smaller than the number of scannings (number of paths) until image completion, and only mask patterns corresponding to a plurality of other nozzles for recording the same positions as those of the non-ejection nozzles are rewritten in the prepared mask data. However, in this technique, the mask data for complementing non-ejection must be prepared to have the number of paths less than the maximum number of paths by one path. Thus, in view of probable non-ejecting nozzles, the mask data must be prepared in advance, so that storing means for storing the mask data such as a memory has to be prepared.

When the number of non-ejection nozzles is large, the readout for copying of mask data for complementing non-ejection and the writing of the mask data for practical use in the mask processing are necessary, so that this procedure needs a long time.

SUMMARY OF THE INVENTION

The present invention provides an inkjet recording apparatus having main scanning means for scanning a recording medium with a recording head, including a plurality of nozzles arranged thereon, in a main scanning direction different from the arranging direction of the nozzles, and conveying means for conveying the recording medium relative to the recording head in a counter-scanning direction different from the main scanning direction. The apparatus includes: record controlling means for recording to complete an image by multiple scannings in the main scanning direction, in which the distance of the recording medium conveying following the scanning with the recording head by the main scanning means is reduced less than the arrangement width of the plurality of nozzles, and the relative position in the counter-scanning direction between the recording head and the recording medium is varied; storing means for storing a mask pattern for completing an image by the multiple scannings with the recording head in the main scanning direction by the record controlling means, wherein the mask pattern is for thinning image data to be recorded; and computing means having a register with a predetermined number of bits for computing and controlling the recording apparatus, wherein the computing means produces mask data in the register for completing an image by the multiple scannings with the recording head without using a defective nozzle, and wherein the computing means controls the mask pattern stored in the storing means to be rewritten by repeatedly reproducing the produced mask data.

The present invention provides a method for controlling an inkjet recording apparatus having main scanning means for scanning a recording medium with a recording head, including a plurality of nozzles arranged thereon, in a main scanning direction different from the arranging direction of the nozzles, and conveying means for conveying the recording medium relative to the recording head in a counter-scanning direction different from the main scanning direction. The present invention also provides a method for recording to complete an image by multiple scannings in the main scanning direction, in which the distance of the conveying of the recording medium following the scanning with the recording head by the main scanning means is reduced less than the arrangement width of the plurality of nozzles, and the relative position in the counter-scanning direction between the recording head and the recording medium is varied. The method includes the steps of producing rewriting mask data in a register with a predetermined number of bits of computing means for controlling the apparatus when recording without using a defective nozzle among the plurality of nozzles, and rewriting a mask pattern for completing an image by the multiple scannings with the recording head in the main scanning direction by repeating the mask data in the register, wherein the mask pattern is for thinning image data to be recorded, and wherein in the producing step, the mask data is produced in the register for completing an image by the multiple scannings with the recording head without using a defective nozzle, and by repeatedly reproducing the produced mask data, the mask pattern stored in advance is rewritten.

According to the present invention, in order to achieve complementary recording by normal nozzles in a region where recording is incapable due to a defective nozzle, a mask pattern used for multi-path recording is rewritten by repeating mask data produced in a CPU register. Thus, it is not necessary to prepare mask data by presuming a defective nozzle in advance, so that high speed processing can be performed with simple configuration.

The number of nozzles used for rewriting a mask pattern in complementing non-ejection is limited to a factor of a CPU register, so that the mask pattern can be rapidly rewritten by repeatedly reproducing the mask data produced in the register.

Further features and advantages of the present invention will become apparent from the following description of exemplary embodiments with reference to the attached drawings.

BRIEF DESCRIPTION OF THE DRAWINGS

FIGS. 7A to 7C are schematic views illustrating multipath recording.

DESCRIPTION OF THE EMBODIMENTS

Figure 1:
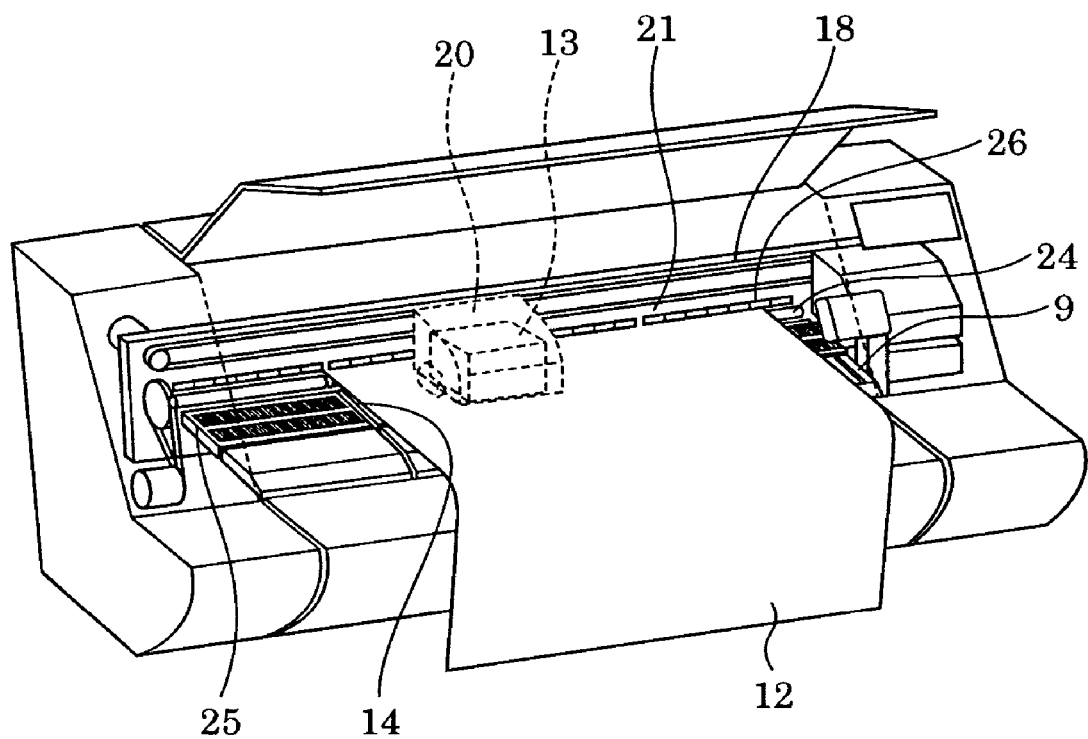
FIG. 1 is an external view of an image-forming apparatus applicable to the present invention.

Embodiments of the present invention will be described below in detail with reference to the drawings.

First Embodiment

According to the embodiments below, a serial recording apparatus is exemplified in that recording is performed by repeating the scanning a recording medium with a recording head in the main scanning direction and conveying (counter scanning) the recording medium in the counter-scanning direction. However, the present invention is not limited to this structure, so that the recording head may be relatively scanned with the recording medium. That is, a recording apparatus may incorporate the present invention, in which the recording medium is relatively moved while the recording head being fixed in at least one of the main scanning and the counter scanning directions.

An inkjet recording apparatus (image-forming apparatus) as described below is capable of multi-path recording in that respective recording regions scanned with the recording head in multiple times are overlapped by reducing the amount of the counter scanning after the main scanning with the recording head in the main scanning direction to an amount less than the width of the orifice region of the recording head (recording width). This enables scanning the overlapped region with the recording head in multiple times in the main scanning direction to complete the recording. In each scanning, image data to be recorded are thinned using mask patterns prepared in advance, and the recording is performed according to the thinned image data. The mask patterns are stored in storing means such as RAM and controlled by controlling means for use in thinning image data by reading out them. In addition, the storing means is not limited to the RAM, so that various storing means such as ROM may be applied.

According to the present invention, a mask pattern is rewritten for multi-path recording without using a defective nozzle unsuitable for recording due to nozzle clogging or a kink in the ejection direction. In rewriting the mask pattern, when pattern data for rewriting (mask data) are prepared by taking defective nozzles into consideration in advance, a mechanism for storing the data is required. However, according to the present invention, the mask data are produced in a register of a CPU for computation, and the mask pattern is rewritten according to the mask data. Since the number of bits of the register included in the CPU is limited, the mask data is produced in a size that can be stored in the register so that the mask pattern is rewritten by repeating this mask data. In such a configuration, it is not necessary to prepare the mask data for rewriting corresponding to the width in the main scanning direction so that the memory capacity required for storing can be reduced. Also, according to the present invention, much less operation that the mask data are produced in the register of the CPU for repeatedly rewriting is required so that the processing time for the mask data producing and rewriting can be reduced.

FIG. 1 is an exterior view of an inkjet image-forming apparatus according to the present embodiment.

An inkjet recording head 13 for ejecting ink is mounted on a carriage 20. The recording head 13 used in the recording apparatus according to the embodiment includes a plurality of nozzles (not shown) for ejecting multicolor inks of black, light cyan, cyan, light magenta, magenta, and yellow. The nozzles are arranged on the recording head so as to constitute a nozzle line. An outer opening of each nozzle is an orifice, and the nozzle and the orifice have the same meaning in the description below except when they are specifically distinguished.

Ink tanks (not shown) corresponding to each color ink for ejection are mounted on the apparatus. In the recording apparatus according to the present embodiment, photographic image quality recordings are achieved by adding low recording density inks (light cyan and light magenta) to cyan and magenta, respectively, in addition to the essential four-color inks of black, cyan, magenta, and yellow.

The carriage 20 is supported on a support rail (not shown) movable in a direction (the main scanning direction) perpendicular to a conveying direction of a recording sheet, and driven by a carriage drive system (discussed below) via a carriage drive belt 18. A linear scale 21 is also arranged in parallel to the support rail. The linear scale 21 provides a reference for locating the carriage 20 in the main scanning direction, and functions together with a linear scale sensor 21 attached to the carriage 20.

A recording sheet 12 is conveyed by a sheet hold roller 26 and a main conveying roller 24 from the front of the apparatus or a paper feed unit to a carriage scanning region on a platen 14. Meanwhile, in the carriage scanning region, ink droplets are ejected from a nozzle line for each color provided in the recording head 13 so as to form images on the recording sheet 12.

On the platen 14, there are provided sucking nozzles 25 for sucking recording sheets. By a sucking fan (not shown) arranged so as to eject air out from the inside of the platen 14, air is sucked through the sucking nozzles 25 so as to maintain the platen inside under a negative pressure. Due to the negative pressure, a recording sheet 12 in contact with the platen 14 is sucked to the platen 14 and held thereto.

Figure 2:
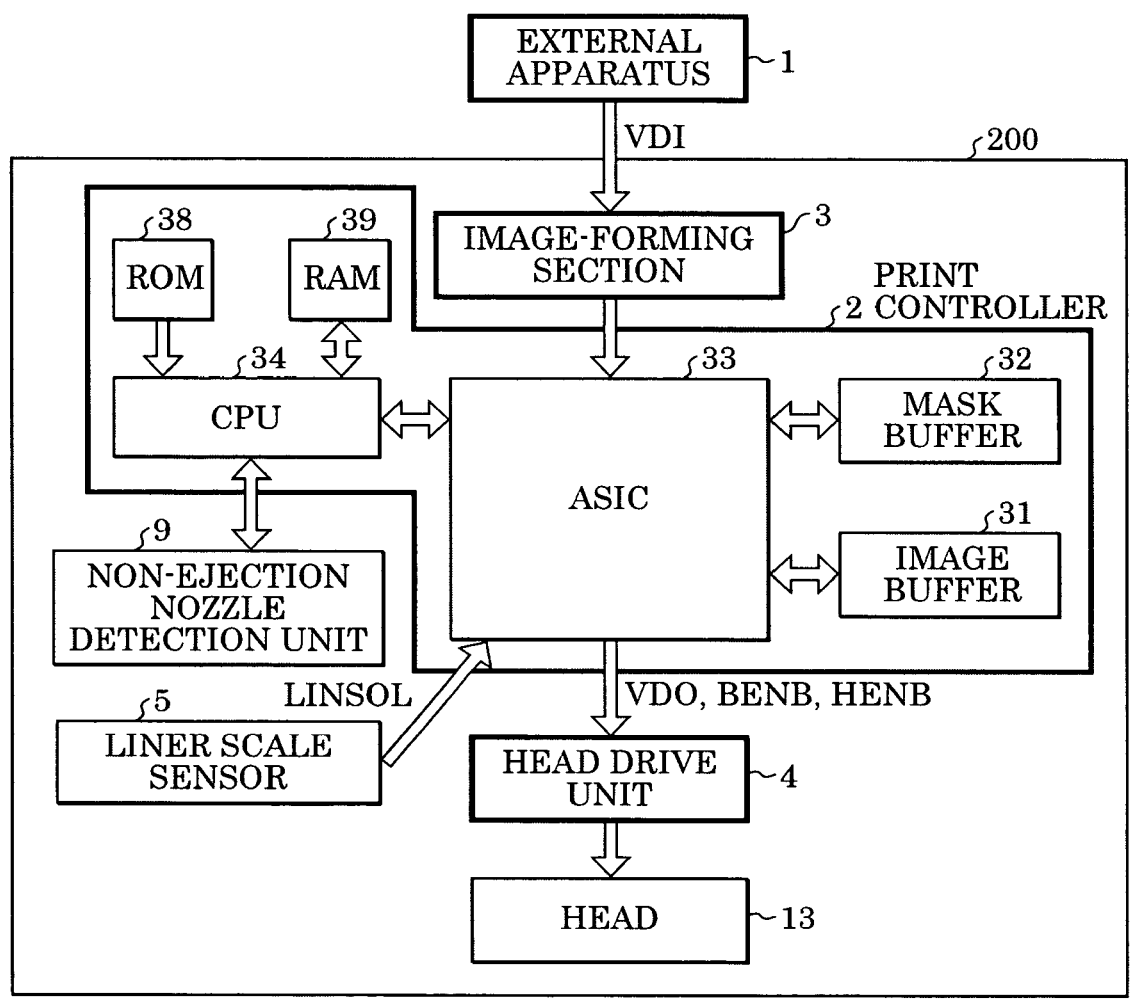
FIG. 2 is a block diagram showing the image-forming apparatus applicable to the present invention and an external apparatus.

FIG. 2 is a block diagram of a schematic control configuration of the apparatus shown in FIG. 1. FIG. 2 shows an image-forming system composed of an inkjet image-forming apparatus 200 and an external apparatus 1. The external apparatus 1 includes an image scanner, a personal computer, and a CAD (not shown). The image-forming apparatus 200 includes an image forming section 3, a print controller 2, and a head drive unit 4.

The operation of the image-forming apparatus will now be described.

Image data VDI transferred from the external apparatus 1 is received by the image forming section 3. The image forming section 3 converts the received data into an image with a width corresponding to one carriage movement in order to compute positions of the produced image in counter-scanning direction, in the main scanning direction, and the image size. Then, the positions of the image in the counter-scanning direction and in the main scanning direction computed in the image forming section 3, a printing direction, and the image size are provided to the print controller 2. The print controller 2 conveys a recording sheet based on the position in the counter-scanning direction provided by the image forming section 3. Furthermore, the print controller 2 establishes the movement position in the main scanning direction based on the data of the position in the main scanning direction, the printing direction, and the image size so as to move the carriage. At this point, the data produced in the image forming section 3 is temporarily stored in an image buffer 31.

In the head drive unit 4, nozzle image data produced by adding data held in the image buffer 31 to mask data set in a mask buffer in an application specific integrated circuit (ASIC) 33 is outputted simultaneously with a timing signal (discussed below) generated by the movement in the main scanning direction (VDO). By driving the recording head 13 according to the image data, images are formed on a recording sheet.

The image forming section 3, serving as an interface to the external apparatus 1, controls each memory and I/Cs (not shown) so as to convert the image data VDI from the external apparatus 1 into raster bit data for outputting to the print controller 2.

The print controller 2 includes a CPU 34, a ROM 38 for storing a program executed by the CPU 34 and a print pattern, a RAM 39 including an operational region and a temporary save-region of the CPU 34, a mask buffer 32, and an image memory 31 for temporarily storing the image data. The CPU 34, serving as an interface to the image forming section 3 producing the raster bit data, controls the entire operation of the print controller 2 including the RAM 39 and the I/Cs. The CPU 34 also controls a media conveying mechanism (not shown) and a carriage drive mechanism.

The CPU 34 of the print controller 2 controls the ASIC 33 so as to convert the raster bit data having an image received from the image-forming section 3 into data in a nozzle (slice) unit (not shown) for driving the head so as to temporarily store the data in the image buffer 31. The stored data in a nozzle unit having mask data held in a mask buffer 32 added thereto is processed so that only the nozzle corresponding to a non-mask bit of the mask data ejects ink, and the image data VDO is produced along with scanning with the head. Using a signal LNSOL produced from the linear scale sensor 5, along with the scanning with the head, print controls, such as the output of the image data VDO, are synchronized.

That is, the linear scale sensor 5 detects a scale identical to (or an integral multiple or an integral submultiple of) an ink-ejection interval recorded in the linear scale 21 (FIG. 1) so as to produce two pulse signals LINSOL with different phases. The moving direction of the carriage 20 is detected from the two pulse signals while the present position of the carriage 20 is detected by counting the pulse signals.

The ink ejection from a plurality of nozzles, which are divided into a plurality of blocks, arranged on the recording head 13 is driven by sharing by time in a block unit. By dividing the nozzles into the blocks so as to drive them in such a manner, the number of simultaneously driven nozzles is reduced to suppress the power-supply capacity of the apparatus. For this driving, the printing controller 2 also produces block enable signals BENB 0 to 7 for each block of the recording head 13 and heater enable signal HENB for driving a heater (signal required for ink ejection).

According to the embodiment, the recording head 13 is provided with 1280 nozzles for each color arranged thereon, and since the 1280 nozzles for each color are divided into 24 blocks to drive them, 24 block enable signals exist.

The image data VDO, the block enable signals BENB 0 to 7, and the heater drive pulse signal HENB produced are transferred to the recording head 13. In a control circuit within the recording head 13, only the heaters of the nozzles with the enabled VDO and the enable signals (BENB and HENB) for each image are turned on so that ink droplets are ejected from corresponding nozzles so as to form images for one column on a recording sheet.

By repeating such control while a recording sheet is scanned with the recording head 13 in the main scanning direction, images are formed for one band.

In the multipath printing, nozzles are divided into a plurality of sections, and an image is partially formed with each section, so that when divided mask pattern data are overlapped, it is generally established that all the dots are ejected. That is, the mask pattern is used for thinning image data to be recorded, and has a pattern for completing an image by multiple scannings with the recording head in the main scanning direction. The mask pattern used in the multipath recording also has a pattern including information showing record permission and record inhibition corresponding to each ejection of the respective plurality of nozzles of the recording head. At the start of printing, a mask pattern is selected corresponding to the number of divisions (paths) of the printing, and the selected mask pattern is written in a mask buffer. In such a manner, the mask buffer is established corresponding to the number of paths at the start of printing. The number of paths may include four-path recording, which completes an image with four-time scannings, and eight-path recording. If the number of paths is increased, although a longer time is required for completing an image, the density unevenness produced from the recording head can be reduced all the more.

Figure 5:
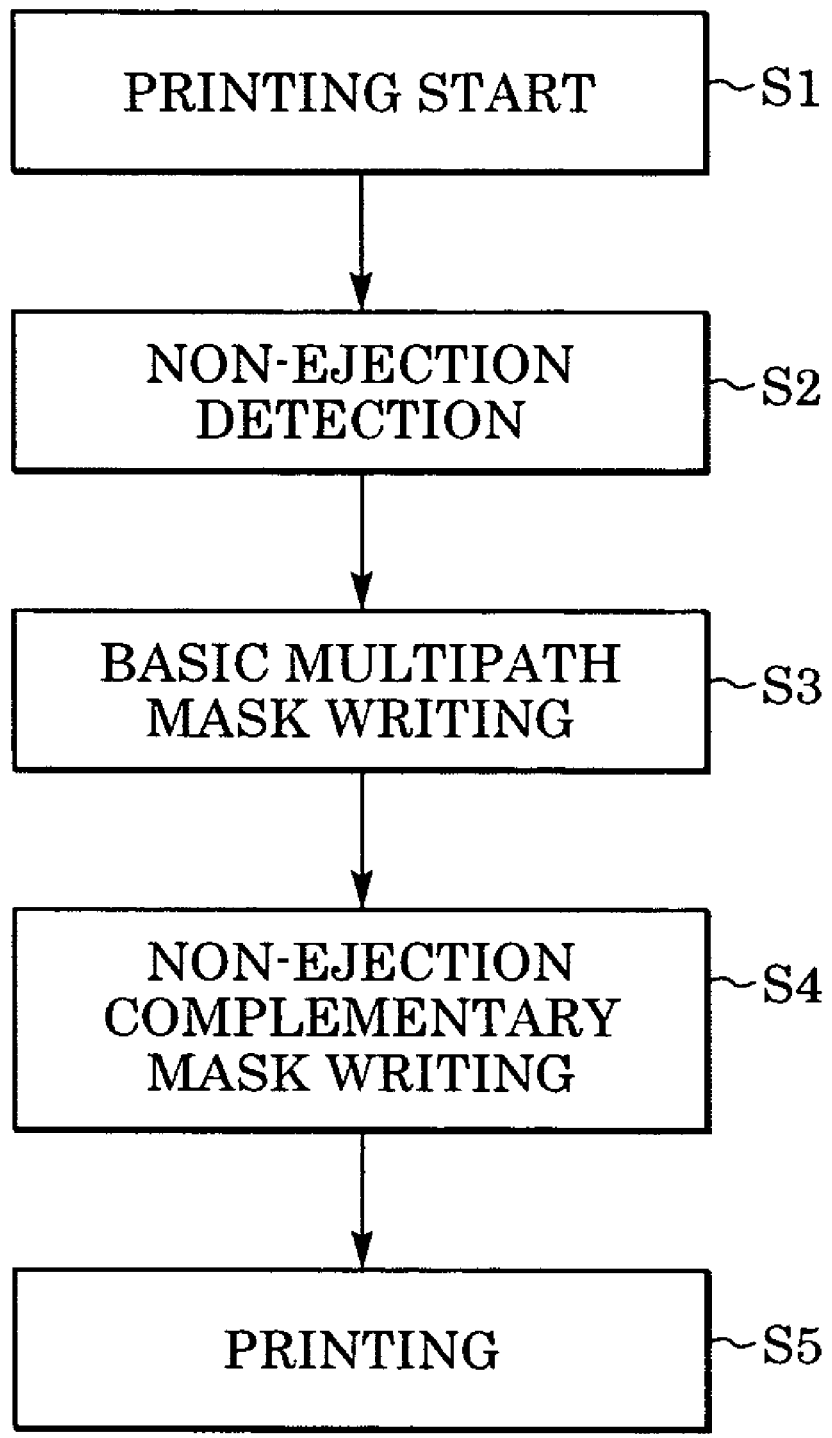
FIG. 5 is a flowchart of a complementing non-ejection process according to the present invention.

The process of a non-ejection nozzle from its detection to its complementary recording is shown in FIG. 5. Following printing start (Step S1), the presence of a non-ejection nozzle is detected (Step S2), a basic multipath recording mask is prepared (Step S3), then, non-ejection complementary mask data is written in basic multipath mask pattern data (Step S4), and continuously, printing is executed (Step S5).

In addition, the presence of a non-ejection nozzle may also be detected at timing different from Step S2 in advance so that the position of the detected non-ejection nozzle is stored. In this case, at Step S2, information about the position of the non-ejection nozzle may be read out.

Then, non-ejection detection will now be described.

The non-ejection nozzle is detected by moving the carriage so that a nozzle line to be detected reaches a position detected by a non-ejection detection unit 9. At this time, the non-ejection detection unit 9 opposes the nozzle line to be detected. At a position where the non-ejection of the nozzle line can be detected, ink is continuously ejected nozzle-by-nozzle from the nozzle line to be detected. The ejected ink droplet continuously obstructs the optical path of a sensor for detecting non-ejection, and when the detection level reduction is detected, it is determined that ink is normally ejected from that nozzle. Accordingly, if the detection level is not changed, the nozzle is determined to be a non-ejection nozzle.

When the printing nozzles are divided into a plurality of sections so that each section is masked with the above-mentioned mask data for producing an image in multiple-times, one raster image is formed by ejecting ink from the divided multiple nozzles.

First, in mask data, mask pattern data corresponding to the number of paths are set at the start of printing. When a plurality of nozzle groups forming one raster image are checked one by one, if a non-ejection nozzle is present, the mask pattern data for the non-ejection nozzle group is rewritten to be all zero (all masked) while the mask data for the group other than the non-ejection nozzle group are rewritten to be all one (1) when they are assumed to be "or", so that all the dots for one line are recorded in a state that the non-ejection nozzle is removed so as to achieve non-ejection complement.

By this process, when a non-ejection complementary nozzle group forming one raster image does not include a non-ejection nozzle, mask data prepared in advance is used, while when including a non-ejection nozzle, non-ejection complementary mask pattern data for completing an image in a state that the non-ejection nozzle is removed is used, so that image failure due to a non-ejection nozzle is eliminated as a whole.

In an edge portion of an image, for reducing an end margin, the sheet may be fed differently from other portions. In such a case, since the combination of a plurality of nozzle groups forming one raster changes every one scanning, the mask data is necessary to be rewritten in each case. When rewriting the non-ejection complementary mask takes a time, the start of printing a band may be delayed, so that rewriting the mask pattern data can be speeded up.

According to the present embodiment, for speeding up the rewriting the mask, the non-ejection complementary mask pattern is produced in a register of a CPU, so that the register of the CPU is repeated to be simply copied so as to have the mask pattern data in a process rewriting the mask pattern data.

Next, the operation of the embodiment will be described with reference to FIGS. 3A, 3B, and 4.

Figure 3A:
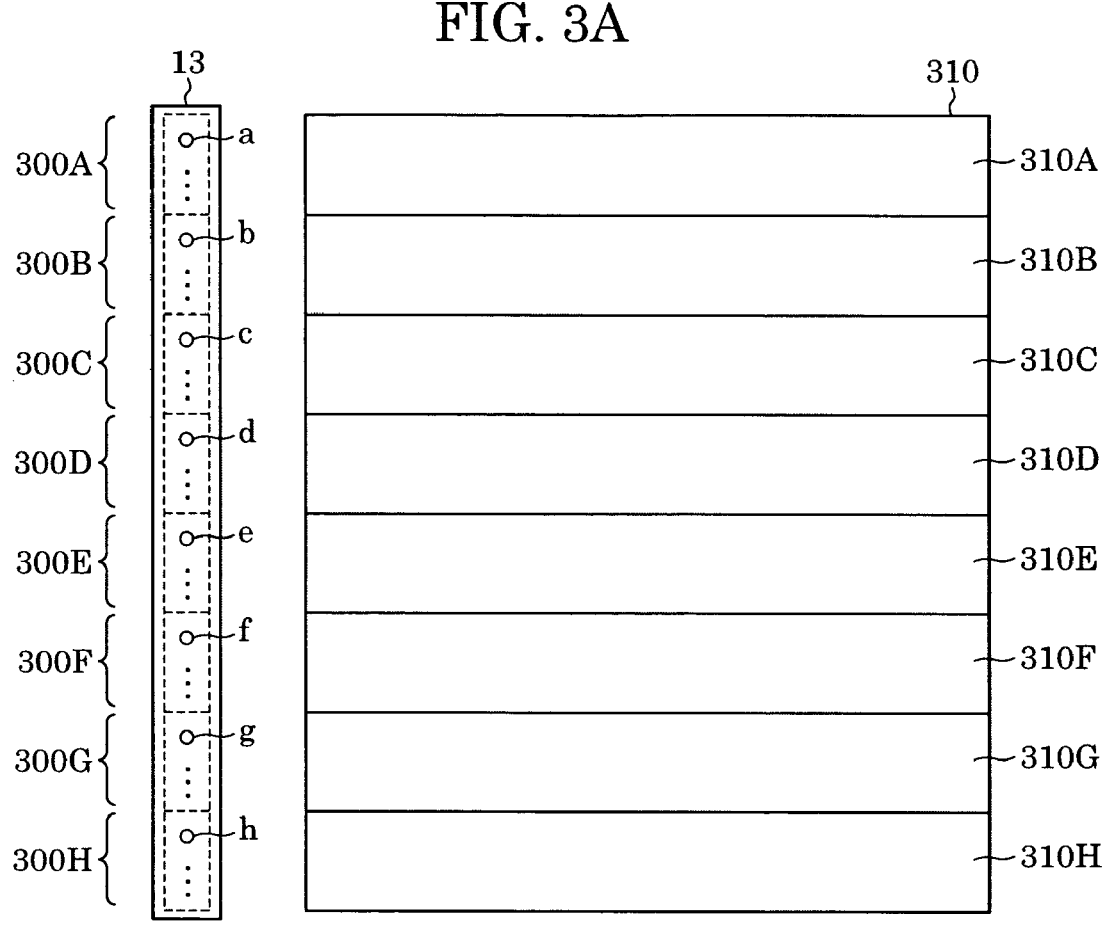
FIGS. 3A and 3B are schematic views showing a configuration of a mask pattern according to a first embodiment of the present invention.

FIG. 3A shows the structure of the recording head 13 and an example of mask pattern data. The recording head 13 is provided with a plurality of nozzles arranged thereon. In the example of the drawing, eight-path recording is exemplified in that the plurality of nozzles are divided into eight blocks 300A to 300H so as to complete image recording with eight scannings.

Mask pattern data 310 corresponds to a nozzle arranged on the recording head 13, and mask pattern data 310A to 310H corresponding to each block are stored in corresponding regions of the mask buffer 32.

The nozzles a to h of the recording head 13 are for use in the same raster recording with eight scannings.

Figure 3B:
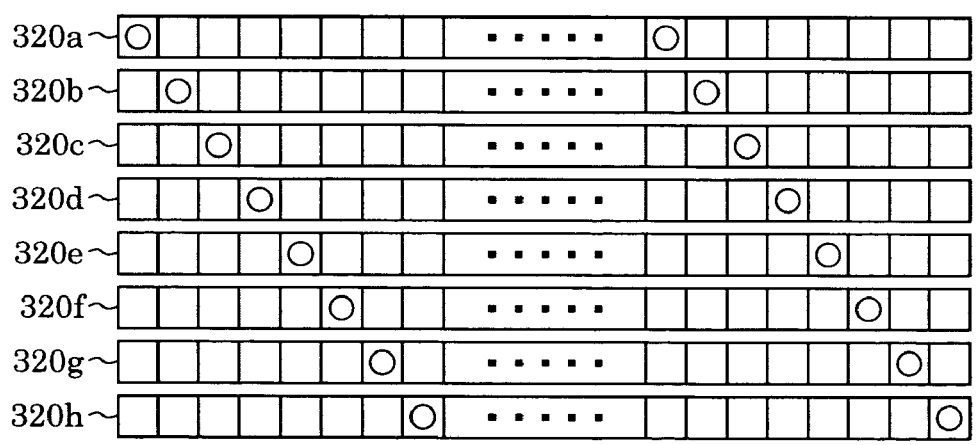

FIG. 3B is a schematic view of the mask pattern data respectively corresponding to the above-mentioned nozzles a to h. The mask pattern data are examples extracted from the above-mentioned mask pattern data 310. The image data are masked according to the mask pattern data, so that the original image data are thinned for recording. Referring to FIG.

3B, pixels indicated by symbol ○ are not masked while pixels not indicated by symbol ○ are masked, so that the image data are thinned.

In FIG. 3B, any of the nozzles a to h shows mask pattern data used in a normal ejection state. Mask pattern data 320a to 320h correspond to the nozzles a to h, respectively. From the drawing, it is understood that the same raster data be complementarily recorded with eight scannings.

Figure 4:
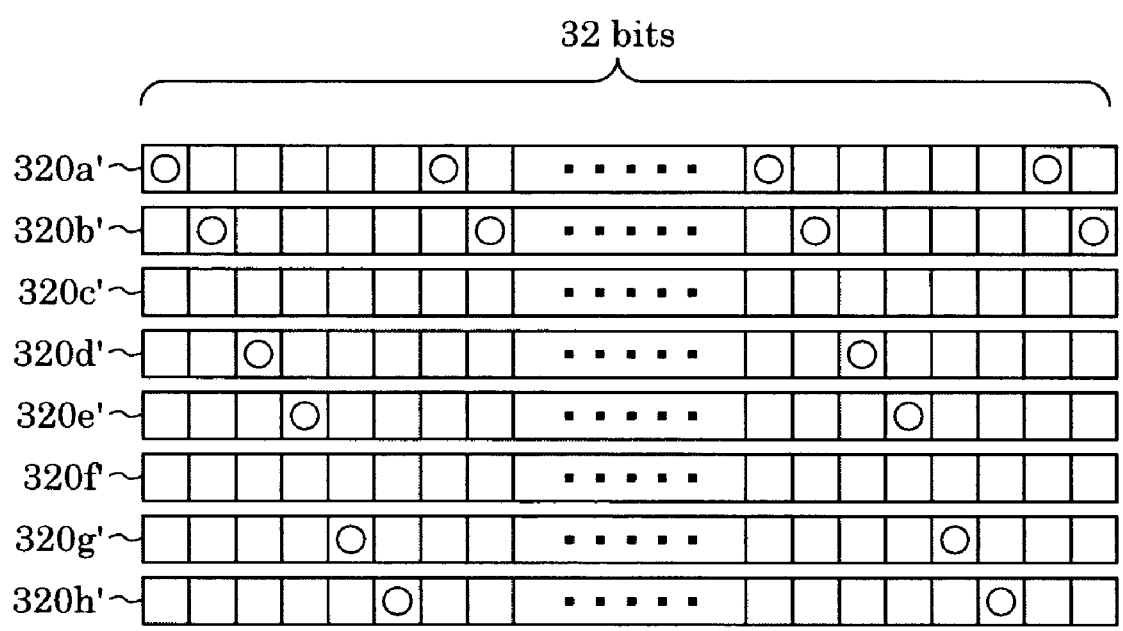
FIG. 4 shows an example of a mask pattern for complementing non-ejection produced according to the first embodiment of the present invention.

FIG. 4 shows an example of mask pattern data produced in the register of the CPU when non-ejection is generated in the nozzle f of the nozzles a to h. When non-ejection is generated in the nozzles c and f, the mask pattern data 310 stored in the mask buffer 32 are rewritten so that an image is recorded with eight scannings using normal nozzles.

The mask pattern data 310a corresponding to the nozzle "a" is rewritten to data 320a' shown in FIG. 4. The mask pattern data 310b corresponding to the nozzle "b" is rewritten to data 320b'. Similarly, the mask pattern data 310c to 310h corresponding to the nozzles c to h are rewritten to data 320c' to 320h'. Since the nozzles c and f are in a non-ejection state, their mask pattern data are rewritten to entirely masked data 320c' and 320f' as shown in the drawing.

According to the present embodiment, the CPU has a 32-bit register. Hence, 32-bit data for rewriting corresponding to one nozzle is produced, so that the corresponding mask pattern data in the mask buffer 32 is rewritten by repeatedly producing the 32-bit data. After the mask pattern corresponding to one nozzle is rewritten, nozzle data for the next rewriting is produced so as to rewrite it in the same way. When the process for the entire nozzles to be rewritten is finished, the rewriting of the mask pattern data is completed.

From FIG. 4, it is understood that data exist in that masking is not performed on the nozzles a, b, d, e, g, and h in addition to the non-ejection nozzles c and f. Using the mask pattern data rewritten according to the data shown in FIG. 4, an image is recorded by the multipath recording without using the non-ejection nozzle.

As described above, according to the present invention, when a non-ejection nozzle is generated, mask pattern data is rewritten so that an image is recorded by the multipath system without using the non-ejection nozzle. According to the present invention, in the rewriting process of the mask pattern data, rewriting data is produced in the register of the CPU, and the mask pattern data is rewritten by repeating the produced data. According to the present invention, it is not necessary to prepare mask data by assuming defective ejection in advance, so that high speed processing can be performed with simple configuration.

Second Embodiment

Next, a second embodiment of the present invention will be described.

According to the second embodiment, in the same way as in the first embodiment, a rewriting mask pattern (mask data) is produced in the register of the CPU, so that the original mask pattern is rewritten by repeating the produced mask data.

In order to simply and repeatedly copy the content of the register of the CPU, it is necessary that the rewriting mask pattern (mask data) has a size capable of being stored in the bit size of the CPU register.

Also, a plurality of nozzles used for complementarily recording a non-ejection nozzle can be used equally. To do so, it is required that the number of nozzles used for complementing recording be divisible by the number of bits of the UPU register.

That is, according to the first embodiment, upon eight-path recording, two nozzles are non-ejecting so that complementing recording is performed using six nozzles; however, the nozzles cannot be equally used in this case. That is, according to the first embodiment, the CPU register has a 32-bit size, so that the size is indivisible by six and the two-bit size is concentrated in specific two nozzles. According to the first embodiment, the indivisible two-bit size is sequentially allocated by a non-mask bit so that complementary mask data is produced using all the bits of the CPU register. In such a manner, when frequency in use of nozzles is not required to be equal, high-speed processing is possible.

According to the second embodiment, in order to equally use a plurality of nozzles used for complementarily recording, the number of nozzles used therefor is limited to the factor of the number of bits of the CPU register, and is rewritten according mask data entirely not ejecting ink for other nozzles. For example, when the CPU register has a 32-bit size, the factors are 32, 16, 8, 4, and 1. Hence, upon eight-path recording, when two nozzles are non-ejecting among eight nozzles for recording the same raster, four nozzles are used among six nozzles used for complementarily recording because of limitation to the factor. Among the six nozzles, nozzles other than four nozzles used are established to be all zero (entirely masked).

The mask data according to the embodiment produced in the CPU register will now be described.

When the multipath printing is eight-path printing completing an image with eight paths, if there is a nozzle group forming one raster including two non-ejection nozzles, the image may be complemented with six rasters at most, so that four nozzles less than six are selected as the factor.

Figure 6:
FIG. 6 shows an example of a mask pattern for complementing non-ejection produced according to a second embodiment of the present invention.

Since in the CPU register, the ejection may be performed once four bits, one non-mask bit is established once four bits, and each nozzle is further established to displace the ejection position (FIG. 6).

FIG. 6 shows mask data corresponding to eight nozzles for recording the same raster with another path, which are 32-bit data capable of producing in the CPU register. In the drawing, since nozzles 1 and 4 are non-ejecting, the complementing recording is enabled with the other six nozzles. However, the number of nozzles for use in complementing record is four. In the drawing, an example where nozzles 7 and 8 are not used is shown. The mask data corresponding to the nozzles 7 and 8 are entirely masked.

In such a manner, the CPU register is established so as to produce the rewriting mask data, and by repeatedly writing the mask data in the mask pattern data, the mask for complementing non-ejection can be rapidly rewritten. Also, it is not necessary to separately prepare mask pattern data as well as a memory therefor. According to the present embodiment, since the number of nozzles used for complementing recording is limited to the factor of the number of bits of the register, frequency in use of nozzles can be equalized.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-118048 filed Apr. 13, 2004, and Japanese Patent Application No. 2005-073113 filed Mar. 15, 2005, which are hereby incorporated by reference herein.

What is claimed is:

1. An inkjet recording apparatus using a recording head including a plurality of nozzles arranged thereon, the apparatus having main scanning means for scanning the recording head relative to a recording medium in a main scan direction different from the arranging direction of the nozzles and conveying means for conveying the recording medium relative to the recording head in a sub-scanning direction different from the main scanning direction, the apparatus comprising:

record controlling means for recording to complete an image by reducing the distance of the recording medium conveying less than the arrangement width of the plurality of nozzles, repeating the scannings with the recording head by the scanning means and conveyance of the recording medium, and by multiple scannings with the recording head on the same area on the recording medium;

storing means for storing a mask pattern for completing an image by the multiple scannings with the recording head in the main scanning direction by the record controlling means, the mask pattern being for thinning image data to be recorded; and a processing unit for computing and controlling the recording apparatus, the processing unit having a CPU register with a storage capacity of a predetermined number of words of data, wherein the processing unit produces mask data in the CPU register for completing an image by the multiple scannings with the recording head without using a defective nozzle, and wherein the processing unit rewrites the mask pattern stored in the storing means to be rewritten by repeatedly copying the mask data in the CPU register into the mask pattern, and wherein a mask pattern corresponding to a nozzle other than the defective nozzle for recording the line to be recorded by the defective nozzle by other scanning is allocated using the number of nozzles limited to the factor of the number of bits of the register, and is rewritten according to mask data that does not eject ink entirely for other nozzles.

* * * * *